United States Patent
Gaedker et al.

(10) Patent No.: US 12,011,964 B2
(45) Date of Patent: Jun. 18, 2024

(54) METHOD FOR DETERMINING AN AXLE LOAD OF A TRACTOR

(71) Applicant: DEERE & COMPANY, Moline, IL (US)

(72) Inventors: Simon Gaedker, Glandorf (DE); Andreas Remmelmann, Karlstein (DE); Norman Roessel, Erbach (DE)

(73) Assignee: DEERE & COMPANY, Moline, IL (US)

( * ) Notice: Subject to any disclaimer, the term of this patent is extended or adjusted under 35 U.S.C. 154(b) by 633 days.

(21) Appl. No.: 17/154,559

(22) Filed: Jan. 21, 2021

(65) Prior Publication Data
US 2021/0283968 A1    Sep. 16, 2021

(30) Foreign Application Priority Data
Mar. 13, 2020    (DE) .......................... 102020203285.8

(51) Int. Cl.
| | | |
|---|---|---|
| *B60G 17/019* | (2006.01) | |
| *A01B 63/114* | (2006.01) | |
| *G01G 19/08* | (2006.01) | |
| *G01G 19/10* | (2006.01) | |
| *G01G 19/16* | (2006.01) | |

(52) U.S. Cl.
CPC ........ *B60G 17/019* (2013.01); *A01B 63/1145* (2013.01); *G01G 19/08* (2013.01); *G01G 19/10* (2013.01); *G01G 19/16* (2013.01); *B60G 2204/11* (2013.01); *B60G 2300/082* (2013.01);
(Continued)

(58) Field of Classification Search
CPC .............. B60G 17/019; B60G 2204/11; B60G 2300/082; B60G 2400/51; B60G 2400/61; G01G 19/08; G01G 19/10; G01G 19/16; A01B 63/1145
See application file for complete search history.

(56) References Cited

U.S. PATENT DOCUMENTS

| | | | |
|---|---|---|---|
| 8,352,121 B2 * | 1/2013 | Bitter ...................... | A01B 63/11 701/36 |
| 9,693,502 B2 * | 7/2017 | Gofron ................ | A01D 41/141 |

(Continued)

FOREIGN PATENT DOCUMENTS

| | | | | |
|---|---|---|---|---|
| DE | 4328147 A1 * | 2/1995 | ........... | A01B 59/069 |
| DE | 102005040954 A1 * | 12/2006 | ........... | B62D 49/085 |

(Continued)

OTHER PUBLICATIONS

Translation DE 4328147 (Year: 1995).*
(Continued)

*Primary Examiner* — Peter J Macchiarolo
*Assistant Examiner* — Monica S Young
(74) *Attorney, Agent, or Firm* — Taft Stettinius & Hollister LLP; Stephen F. Rost

(57) ABSTRACT

A method for determining an axle load on a vehicle axle of a tractor includes providing a power lift and a payload coupled thereto, driving the power lift by a hydraulic pump, setting a pump pressure of the hydraulic pump as a function of the coupled payload, detecting the pump pressure by a sensor, and determining the axle load as a function of the detected pump pressure from characteristic data which represents a relationship between the pump pressure and the weight of the payload.

13 Claims, 2 Drawing Sheets

(52) U.S. Cl.
CPC ...... *B60G 2400/51* (2013.01); *B60G 2400/61* (2013.01)

(56) References Cited

U.S. PATENT DOCUMENTS

| | | | | |
|---|---|---|---|---|
| 2002/0002431 | A1* | 1/2002 | Panizzolo | B62D 49/08 |
| | | | | 701/50 |
| 2004/0178005 | A1* | 9/2004 | Carlstrom | G01G 19/10 |
| | | | | 177/139 |
| 2016/0297275 | A1* | 10/2016 | Traut | B60G 17/01941 |
| 2018/0116096 | A1* | 5/2018 | Gresch | G01G 19/083 |
| 2019/0176560 | A1* | 6/2019 | Bittner | B60G 17/0165 |

FOREIGN PATENT DOCUMENTS

| | | | | | |
|---|---|---|---|---|---|
| DE | 102006050126 | A1 | * | 5/2008 | ......... A01B 63/1006 |
| DE | 102011086828 | | * | 10/2013 | ............ A01B 67/00 |
| DE | 102015206369 | A1 | | 10/2016 | |
| DE | 102018206462 | A1 | * | 10/2019 | ......... B60G 17/0152 |
| EP | 0433669 | A1 | | 6/1991 | |
| EP | 0518226 | A1 | * | 12/1992 | |
| EP | 0433669 | A1 | * | 9/1996 | |
| EP | 2829854 | A1 | * | 1/2015 | ............. B66C 23/36 |
| EP | 3315926 | A1 | * | 5/2018 | ........... A01B 59/065 |
| JP | 2023030376 | A | * | 3/2023 | |
| RU | 2453658 | C2 | * | 6/2012 | ............ E02F 9/2228 |

OTHER PUBLICATIONS

Translation EP0433669 (Year: 1996).*
Translation DE 102011086828 (Year: 2013).*
Translation RU-2453658 (Year: 2012).*
European Search Report issued in European Patent Application No. 21156245.9, dated Jul. 12, 2021, 7 pages.

* cited by examiner

METHOD FOR DETERMINING AN AXLE LOAD OF A TRACTOR

RELATED APPLICATIONS

This application claims priority to German Application No. 102020203285.8, filed Mar. 13, 2020, the disclosure of which is hereby expressly incorporated by reference in its entirety.

FIELD OF THE DISCLOSURE

The present disclosure relates to a method for determining an axle load on a vehicle axle of a tractor having a power lift, an attachment being coupled thereto.

BACKGROUND

For the various uses of a tractor it is often important to determine the axle load on a vehicle axle and to transmit this information to the driver or to use this information for automated tasks of the tractor.

There is a need to determine an axle load of the tractor in a technically simple and cost-effective manner.

SUMMARY

According to the present disclosure, an axle load on a vehicle axle of a tractor is determined of a method. The tractor has a power lift, a payload being coupleable thereto. The power lift is driven by a hydraulic pump. A pump pressure of said hydraulic pump at the pump outlet is set as a function of the coupled payload. The pump pressure is detected, and the axle load is determined as a function of the detected pump pressure.

Thus, the pump pressure serves as an auxiliary variable for determining an axle load of the tractor. Since the pump pressure, in particular in the case of a load-controlled pump, correlates with the weight of the coupled payload, taking into consideration the pump pressure constitutes a technically simple measure for a relatively accurate determination of the axle load.

This method avoids other elaborate or technically complex methods for determining the axle load when, on the one hand, knowing a current axle load is important and, on the other hand, the weight of the coupled payload is not known or continuously changes during operational use.

A changing weight of the payload is relevant, for example, in attachments (for example, seed containers, fertilizer spreaders, etc.).

For example, in the case of a load-controlled hydraulic system, the pump pressure is set by the weight of the payload when the power lift control valve is open.

The power lift, which is driven by a hydraulic pump for its lifting movements, generally has hydraulic components, for example, a hydraulic lifting cylinder or a hydraulic upper link. The power lift is configured, in particular, as a three-point power lift with one upper link and two lower links.

The axle load of a vehicle axle (rear axle or front axle) of the tractor may be determined by the method.

The pump pressure prevailing at the pump outlet is detected by a sensor, in particular a pressure sensor. As a result, the method may be carried out with minimal additional component cost or with components which are already present in any case as standard on the tractor. Thus, the method assists a cost-effective and technically simple solution for determining an axle load.

In order to keep the implementation of the method technically simple, the axle load is detected from characteristic data which represents or describes a relationship between the pump pressure and the weight of the payload. The characteristic data is provided as a characteristic curve or a family of characteristics having a plurality of characteristic curves and containing this characteristic curve. The characteristic data may be generated, for example, during the course of a calibration outside operational use of the tractor.

In order to determine the axle load, at least one of the following variables is taken into consideration:
- a pulling force or a force component of this pulling force acting along a lower link of the power lift,
- a tilt angle of an upper link of the power lift relative to a reference line, in particular to a vehicle horizontal line, and
- a distance along a vehicle vertical line respectively between a coupling point of an upper link and a lower link of the power lift for coupling the payload.

The values of the above-mentioned variables are either known for the respective operational use of the tractor or may be detected by low technical effort (for example, by a conventional sensor) on the tractor. This assists a technically simple determination of the axle load.

Moreover, for the determination of the axle load the lengths of individual lever arms between the rotational axes and the effective forces on components (for example, lower link, upper link, lifting cylinder, lifting strut) of the power lift or the lengths of specific distances on the power lift or between the power lift and the payload may be taken into consideration. The individual lengths are generally known. These lengths are provided as tabular data for different lifting positions of the power lift. This data may be generated, for example, by a calibration cycle or preset in the factory.

The axle load is determined as a function of at least one of the following distances along a vehicle horizontal line. In this case, these distances start from the vehicle axle of the sought axle load. The distances are
- a distance to a further load (for example, a ballast weight) on the tractor,
- a distance to a different vehicle axle,
- a distance to a center of gravity of the tractor, and
- a distance to a coupling point of an upper link or a lower link of the power lift for coupling the payload.

These distances are generally provided as the known vehicle dimensions or as the known lifting geometry of the power lift. Thus, they contribute to a technically simple determination of the sought axle load.

The pump pressure is detected chronologically outside a lifting movement of the power lift, i.e., when the power lift is at a standstill. This avoids any falsification of the detected pump pressure by dynamic forces.

A detection of a pump pressure which is as accurate as possible may be assisted by the pump pressure being detected when the tractor is at a standstill (vehicle velocity=0).

Other hydraulic loads or consumers of the tractor connected to the hydraulic pump are switched off during the detection of the pump pressure. The accuracy of the detected pump pressure is further assisted thereby.

The payload is configured as an attachment (for example, a seed container) or as a ballast weight. This permits a determination of the axle load for the various applications of the tractor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
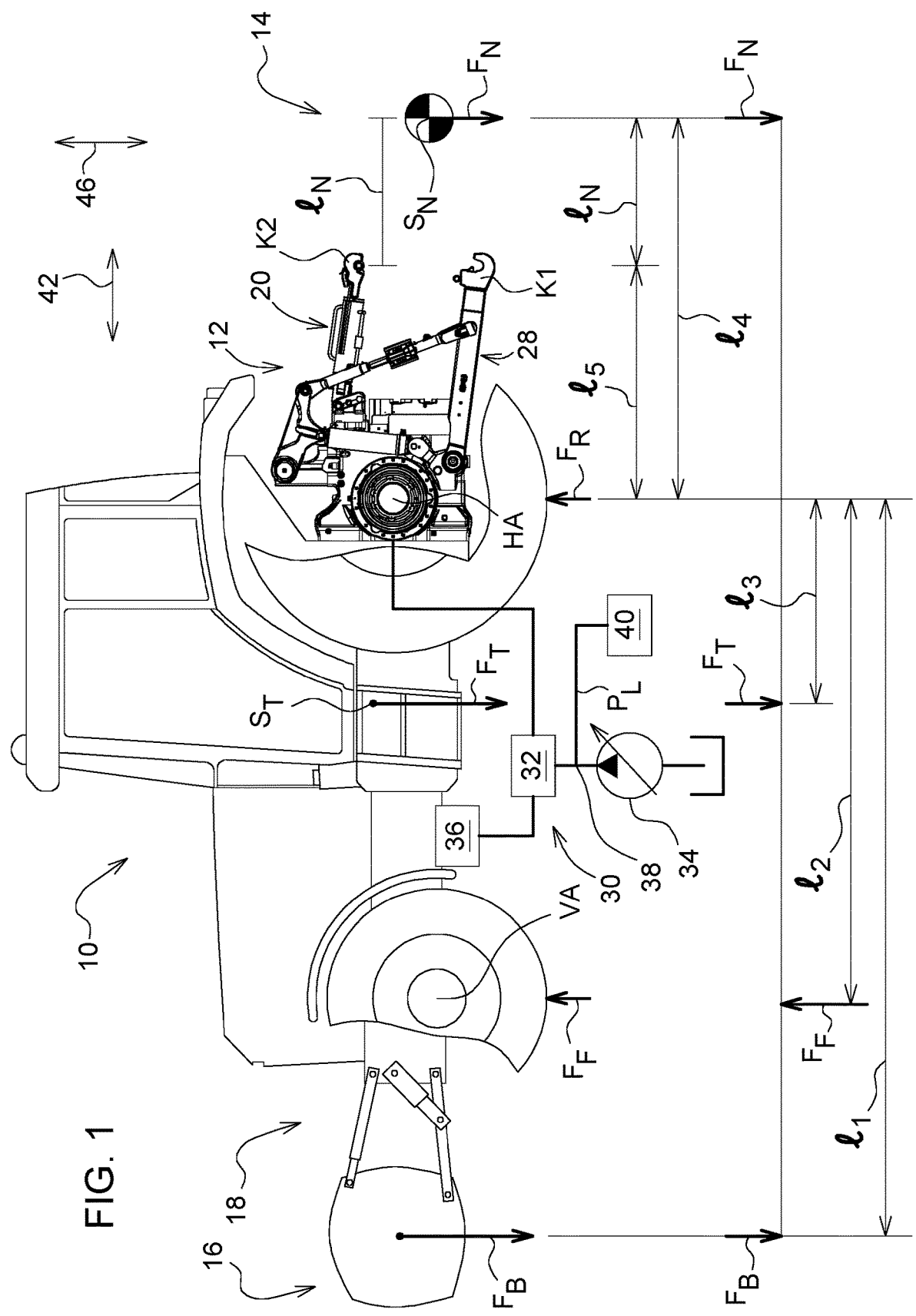
FIG. 1 shows a side view of a tractor with a power lift on the rear side and a payload coupled thereto.

FIG. 1 shows a tractor 10 with a three-point power lift 12 on the rear side and a payload in the form of an attachment 14 coupled thereto. On the front side the tractor 10 bears a ballast weight 16 as a payload which is coupled to a power lift 18 on the front side of the tractor 10.

The power lift 12 on the rear side contains a hydraulic upper link 20, a lifting arm 22 which is supported in an articulated manner on the tractor 10, a hydraulic lifting cylinder 24 which is supported in an articulated manner on the tractor 10 and on the lifting arm 22, and a longitudinally adjustable lifting strut 26 which is supported in an articulated manner on the lifting arm 22 and on a lower link 28. Generally, the power lift 12 contains two lower links 28 which are spaced apart from one another perpendicular to the drawing plane and which in each case are connected to the above-described lever structure.

The lower link 28 has a coupling point K1 while the upper link 20 bears a coupling point K2. Both coupling points K1, K2 serve for the mechanical coupling of the attachment 14.

For its lifting movements the power lift 12 is connected to a hydraulic circuit 30, shown schematically. The hydraulic circuit 30 contains a hydraulic controller 32 (for example, a control device, control valves) and a load-controlled hydraulic pump 34. This hydraulic pump supplies the power lift 12 and also further hydraulic consumers 36 of the tractor 10 with a hydraulic medium.

A pressure sensor 40 is arranged at a pump outlet 38 of the pump 34 in order to measure the current pump pressure or load pressure pL.

The tractor 10 moves in a direction of travel 42 which runs parallel to a vehicle horizontal line 44. A vertical direction 46 of the tractor 10 runs perpendicular thereto. The determination of an axle load of the tractor 10 is based on the physical considerations described hereinafter. In this case the method is represented by way of example using the determination of an axle load $F_R$ on a rear axle HA.

A force equilibrium prevails on the tractor 10 between a weight force $F_B$ of the ballast weight 16, the axle load $F_F$ on a front axle VA, a weight force $F_T$ of the tractor 10, the sought axle load $F_R$ to be determined on the rear axle HA and a weight force $F_N$ of the payload 14. Due to the force equilibrium the following applies to the sum of the above forces $$F_B - F_F + F_T - F_R + F_N = 0 \quad \text{(Gl. 1)}$$

The axle load $F_R$ to be determined is thus $$F_R = F_B - F_F + F_T + F_N \quad \text{(Gl.2)}$$

The weight force $F_B$ of the ballast weight 16 and the weight force $F_T$ of the tractor 10 are usually known. The axle load $F_F$ on the front axle VA is also presumed to be known since it may be detected via a sensor system, for example, of pressure sensor, in the case of a hydraulic axle suspension system. As a result, only the weight force $F_N$ of the payload 14 is unknown.

Figure 2:
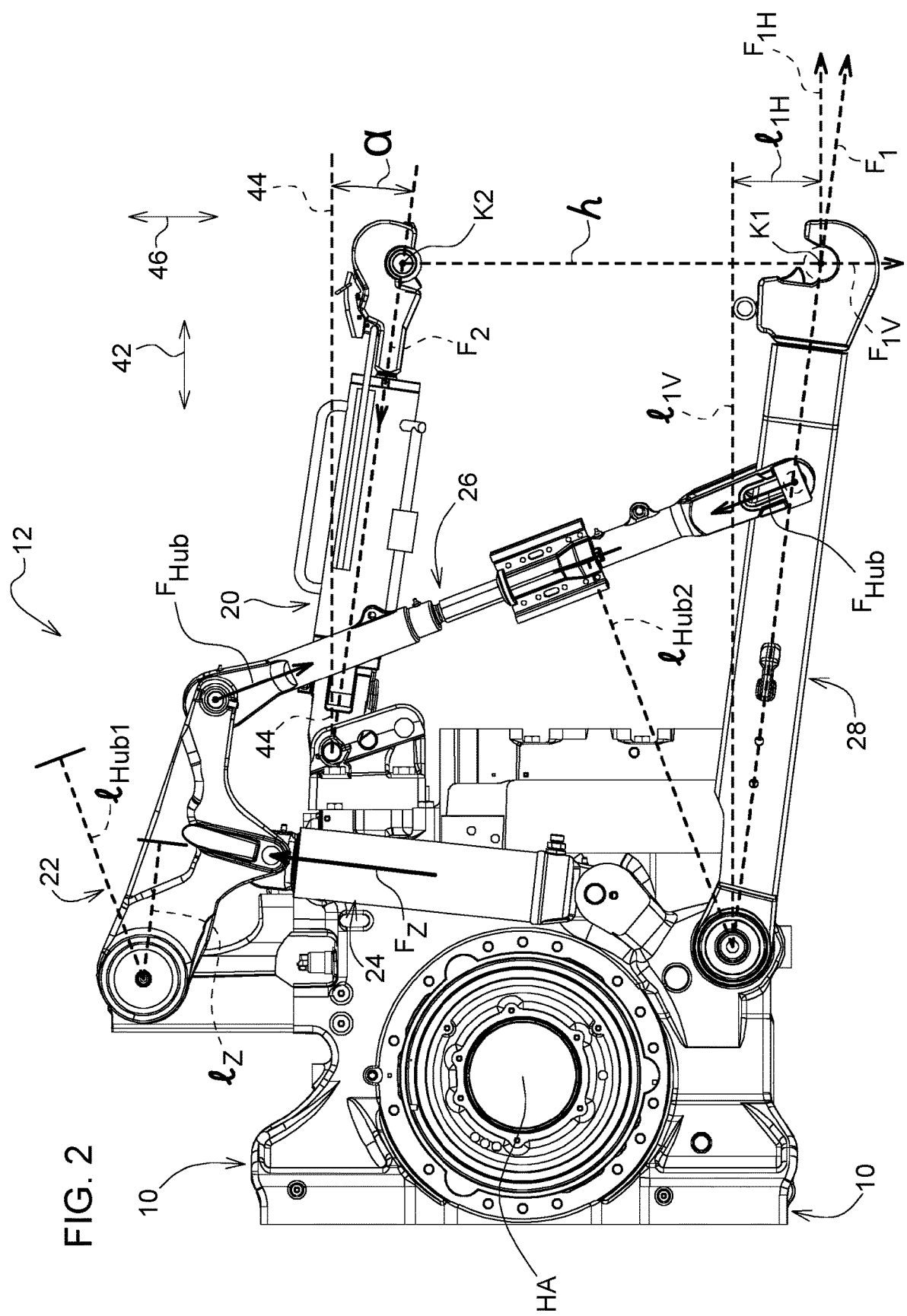
FIG. 2 shows an enlarged side view of the power lift on the rear side.

The unknown weight force $F_N$ of the payload 14 may be detected as a function of the values of variables on the tractor 10 described hereinafter. These variables are able to be derived, in particular, from FIG. 2.

At the coupling point K2 of the upper link 20 for the torque equilibrium, the following applies:

$$F_N \cdot l_N - F_{1H} \cdot h = 0 \quad \text{(Gl.3)}$$

or $$F_{1H} = F_N \cdot l_N / h, \quad \text{(Gl. 4)}$$

wherein $F_{1H}$ is the horizontal force component of the pulling force $F_1$ acting at the coupling point K1, $l_N$ is the horizontal distance (along the vehicle horizontal line 44) between the coupling point K2 and a center of gravity SN of the payload 14 and h is the vertical distance (along the vehicle vertical line 46) between the two coupling points K1, K2.

For a horizontal force equilibrium at the coupling points K1, K2 the following applies:

$$F_{1H} - F_2 \cdot \cos \alpha = 0 \quad \text{(Gl. 5)}$$

or $$F_2 = F_{1H} \cdot 1/\cos \alpha, \quad \text{(Gl. 6)}$$

wherein $F_2$ is the holding force acting at the coupling point K2 and α is a tilt angle of the upper link 20 relative to the vehicle horizontal line 44.

For a vertical force equilibrium at the coupling points K1, K2 the following applies:

$$F_N - F_{1v} - F_2 \cdot \sin \alpha = 0 \quad \text{(Gl. 7)}$$

or $$F_N = F_{1v} + F_2 \cdot \sin \alpha, \quad \text{(Gl. 8)}$$

wherein $F_{1v}$ is the vertical force component of the pulling force $F_1$ acting at the coupling point K1.

The equations Gl. 4 and Gl. 6 inserted into the equation Gl. 8 results in $$F_N = F_{1v} \cdot 1/(1 - \tan \alpha \cdot l_N / h). \quad \text{(Gl. 9)}$$

In the equation Gl. 9 the vertical component $F_{1v}$ may be detected by the following two moment equilibriums on the power lift 12. On the lifting arm 22 the following applies:

$$F_{Hub} = F_Z \cdot l_Z / l_{Hub1}, \quad \text{(Gl. 10)}$$

wherein, $F_{Hub}$ is a force acting on the lifting strut 26 and $l_{Hub1}$ is an associated lever arm. $F_Z$ is a force acting on the lifting cylinder 24 and $l_Z$ is an associated lever arm.

On the lower link 28 the following applies:

$$F_{Hub} \cdot l_{Hub2} + F_{1H} \cdot l_{1H} - F_{1v} \cdot l_{1v} = 0 \quad \text{(Gl.11)}$$

and transposed according to $F_{1v}$ $$F_{1v} = (F_{Hub} \cdot l_{Hub2} / l_{1v}) + (F_{1H} \cdot l_{1H} / l_{1v}). \quad \text{(Gl.12)}$$

The equation Gl. 10 inserted into the equation Gl. 12 for $F_{1v}$ results in $$F_{1v} = (F_Z \cdot l_Z \cdot l_{Hub2} / l_{Hub1} \cdot l_{1v}) + (F_{1H} \cdot l_{1H} / l_{1v}). \quad \text{(Gl.13)}$$

The equation Gl. 13 inserted into the equation Gl. 9 for the weight force $F_N$ of the payload 14 results in $$F_N = 1/l_{1V} \cdot (p_L \cdot A_Z \cdot l_Z \cdot l_{Hub2}/l_{Hub1} + F_{1H} \cdot l_{1H}) \cdot 1/(1 - \tan \alpha \cdot l_N/h). \quad (Gl.\ 14)$$

The force $F_Z$ acting on the lifting cylinder 24 is known by the equation $F_Z = p_L \cdot A_Z$, wherein $A_Z$ is the known cross-sectional surface of the lifting cylinder 24. This results in the following for the equation Gl. 14

$$F_N = 1/l_{1V} \cdot (p_L \cdot A_Z \cdot l_Z \cdot l_{Hub2}/l_{Hub1} + F_{1H} \cdot l_{1H}) \cdot 1/(1 - \tan \alpha \cdot l_N/h). \quad (Gl.\ 15)$$

In the equation Gl. 15 the horizontal distance $l_N$ between the coupling point K2 and the frequently changing center of gravity S of the payload 14 is generally not immediately known. The horizontal distance $l_N$ in the equation Gl. 15 however may be substituted by $$l_N = l_4 - l_5, \quad (Gl.\ 16)$$

as may be derived from FIG. 1. The distance $l_5$ is known from the lifting geometry of the power lift 12. The distance $l_4$ results from considering the torque equilibrium on the rear axle HA as follows:

$$l_4 = (F_B \cdot l_1 - F_F \cdot l_2 + F_T \cdot l_3)/F_N. \quad (Gl.\ 17)$$

For the horizontal distance $l_N$ the following applies $$l_N = ((F_B \cdot l_1 - F_F \cdot l_2 + F_T \cdot l_3)/F_N) - l_5. \quad (Gl.\ 18)$$

The distances $l_1$, $l_2$, $l_3$, $l_4$, $l_5$ run along the vehicle horizontal line 44 and start from the vehicle axle HA of the axle load $F_R$ which is sought or to be determined. Starting in each case from the rear axle HA
- the distance $l_1$ extends to a further load (ballast weight 16),
- the distance $l_2$ extends to the front axle VA
- the distance $l_3$ extends to a center of gravity $S_T$ of the tractor 10,
- the distance $l_4$ extends to the center of gravity $S_T$ of the payload 14, and
- the distance $l_5$ extends to the coupling point K1 of the lower link 28 or to the coupling point K2 of the upper link 20.

Of the equation GL. 18, the horizontal distance $l_N$ may be substituted in the equation GL. 15 and then the equation Gl. 15 may be resolved again according to the weight force $F_N$.

Thus, the known distances $l_1$, $l_2$, $l_3$ (known dimensions of the tractor 10) and the known distance $l_5$ (known lifting geometry of the power lift 12) of the equation Gl. 18 are used for detecting the weight force $F_N$.

The remaining variables of the equation Gl. 15 are also known regarding their values in different lifting positions of the power lift 12 or may be detected in a technically simple manner by conventional sensor means.

Thus, the axle load $F_R$ may be determined from the equation Gl. 2 as a function of the variables according to equation Gl. 15 and equation Gl. 18, i.e. as a function of the pump pressure or load pressure pL and further known variables.

In specific lifting positions of the power lift 12 the equation Gl. 15 may be further simplified, for example, with the upper link 20 running horizontally along the vehicle horizontal line 44 (tan $\alpha = 0$) or with the lower link 28 running horizontally along the vehicle horizontal line 44 ($l_{1H} = 0$).

The length h in the equation Gl. 15 is generally known by the construction of the respective payload 14.

The individual lengths $l_Z$, $l_{Hub2}$, $l_{Hub1}$, $l_{1H}$, $l_{1V}$ in the equation Gl. 15 are also known. In particular, these lengths are provided as tabular data for different lifting positions of the power lift 12. This data may be generated, for example, by a calibration cycle or preset in the factory.

The tilt angle $\alpha$ may be detected, for example, by a sensor arranged on the upper link 20 (for example, an inertial sensor or tilt sensor).

Other sensors arranged on the upper link 20 may detect a holding force $F_2$ of the upper link 20. By the latter sensor the tilt angle $\alpha$ may alternatively be detected via the equation $\alpha = \arccos(F_{1H}/F_2)$ when the force component $F_{1H}$ is also known.

The force component $F_{1H}$ may be detected by a measurement of the pulling force $F_1$. To this end, a suitable sensor (for example, a force measuring bolt, bending bar) may be arranged on the articulated region of the lower link 28 on the tractor side.

In the case of a hydraulic upper link 20 the horizontal force component $F_{1H} = p_L \cdot A_{OL} \cdot \cos \alpha$ may be detected via the horizontal force equilibrium $F_{1H} = F_2 \cdot \cos \alpha$, wherein the tilt angle $\alpha$ is detected and $A_{OL}$ is the known cross-sectional surface of the cylinder of the upper link 20.

An unknown axle load $F_F$ on the front axle VA may also be detected by corresponding physical considerations on the power lift 18 on the front side.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining an axle load on a vehicle axle of a tractor, comprising:
   providing a power lift and a payload coupled thereto;
   driving the power lift by a hydraulic pump;
   setting a pump pressure of the hydraulic pump as a function of the coupled payload;
   detecting a current pump pressure by a sensor arranged at an outlet of the hydraulic pump, wherein the pump pressure is prevailing at the pump outlet and is detected at the pump outlet by the sensor which is arranged at the pump outlet between the hydraulic pump and a hydraulic controller; and
   determining the axle load from characteristic data which represents a relationship between the detected current pump pressure and the weight of the payload, wherein the characteristic data is generated during the course of a calibration outside operational use of the tractor when the tractor is at a standstill and other hydraulic loads or hydraulic consumers of the tractor connected to the hydraulic pump are switched off during the detection of the current pump pressure.

2. The method of claim 1, wherein the determining the axle load step further comprises determining the axle load as a function of a pulling force or a force component of this pulling force acting along a lower link of the power lift.

3. The method of claim 1, wherein the determining the axle load step further comprises determining the axle load as a function of a tilt angle of an upper link of the power lift relative to a reference line.

4. The method of claim 1, wherein the determining the axle load step further comprises determining the axle load as a function of a distance along a vehicle vertical line respectively between a coupling point of an upper link and a lower link of the power lift for coupling the payload.

5. The method of claim 1, wherein the determining the axle load step further comprises determining the axle load as a function of a distance to a further load on the tractor along a vehicle horizontal line starting from the vehicle axle of the sought axle load.

6. The method of claim 1, wherein the determining the axle load step further comprises determining the axle load as a function of a distance to a different vehicle axle along a vehicle horizontal line starting from the vehicle axle of the sought axle load.

7. The method of claim 1, wherein the determining the axle load step further comprises determining the axle load as a function of a distance to a center of gravity of the tractor along a vehicle horizontal line starting from the vehicle axle of the sought axle load.

8. The method of claim 1, wherein the determining the axle load step further comprises determining the axle load as a function of a distance to a coupling point of an upper link or a lower link of the power lift for coupling the payload along a vehicle horizontal line starting from the vehicle axle of the sought axle load.

9. The method of claim 1, wherein the pump pressure is detected chronologically outside a lifting movement of the power lift.

10. The method of claim 1, wherein the payload is coupled as an attachment or as a ballast weight to the power lift.

11. The method of claim 1, wherein the determining the axle load step further comprises determining the axle load as a function of a pulling force or a force component of this pulling force acting along a lower link of the power lift, a tilt angle of an upper link of the power lift relative to a reference line, or a distance along a vehicle vertical line respectively between a coupling point of an upper link and a lower link of the power lift for coupling the payload.

12. The method of claim 1, wherein the determining the axle load step further comprises determining the axle load as a function of a distance along a vehicle horizontal line starting from the vehicle axle of the sought axle load, the distance being a distance to a further load on the tractor, a distance to a different vehicle axle, a distance to a center of gravity of the tractor, or a distance to a coupling point of an upper link or a lower link of the power lift for coupling the payload.

13. A method for determining an axle load on a vehicle axle of a tractor, comprising:
providing a power lift and a payload coupled thereto;
driving the power lift by a hydraulic pump;
setting a pump pressure of the hydraulic pump as a function of the coupled payload;
detecting a current pump pressure by a sensor arranged at an outlet of the hydraulic pump, wherein the pump pressure is prevailing at the outlet of the hydraulic pump and is detected at the pump outlet by the sensor which is arranged at the pump outlet between the hydraulic pump and a hydraulic controller; and
determining the axle load as a function of the detected pump pressure;
wherein, the axle load of the payload is detected from characteristic data which represents a relationship between the pump pressure and the weight of the payload, wherein the characteristic data is generated during the course of a calibration outside operational use of the tractor when the tractor is at a standstill and other hydraulic loads or hydraulic consumers of the tractor connected to the hydraulic pump are switched off during the detection of the current pump pressure; and
wherein the payload is coupled as an attachment or as a ballast weight to the power lift.

\* \* \* \* \*